(12) United States Patent
Serrand et al.

(10) Patent No.: US 12,415,598 B2
(45) Date of Patent: Sep. 16, 2025

(54) GEAR DEVICE

(71) Applicant: Goodrich Actuation Systems SAS, Vernon (FR)

(72) Inventors: Maxime Serrand, Paris (FR); Karl Potier, Aix en Provence (FR)

(73) Assignee: GOODRICH ACTUATION SYSTEMS SAS, Vernon (FR)

( * ) Notice: Subject to any disclaimer, the term of this patent is extended or adjusted under 35 U.S.C. 154(b) by 0 days.

(21) Appl. No.: 18/508,718

(22) Filed: Nov. 14, 2023

(65) Prior Publication Data

US 2024/0166338 A1    May 23, 2024

(30) Foreign Application Priority Data

Nov. 23, 2022 (EP) ..................................... 22306724

(51) Int. Cl.
*F16H 1/46* (2006.01)
*B64C 13/34* (2006.01)
*B64C 13/50* (2006.01)
*F16H 1/28* (2006.01)

(52) U.S. Cl.
CPC .............. *B64C 13/50* (2013.01); *B64C 13/34* (2013.01); *F16H 1/28* (2013.01); *F16H 2001/289* (2013.01)

(58) Field of Classification Search
CPC ...... B64C 13/34; F16H 2001/289; F16H 1/46
USPC .................................................. 475/343, 331
See application file for complete search history.

(56) References Cited

U.S. PATENT DOCUMENTS

| | | | | |
|---|---|---|---|---|
| 2,488,660 A | * | 11/1949 | Conkie | .................. B64D 27/00 475/329 |
| 5,435,794 A | * | 7/1995 | Mori | .................... B60K 17/046 475/341 |
| 6,409,622 B1 | | 6/2002 | Bolz et al. | |

(Continued)

FOREIGN PATENT DOCUMENTS

| DE | 102018132224 A1 * | 6/2020 |
|---|---|---|
| EP | 2636924 A1 | 9/2013 |

(Continued)

OTHER PUBLICATIONS

European Search Report for Application No. 22306724.0, mailed Apr. 20, 2023, 9 pages.

*Primary Examiner* — Sherry L Estremsky
(74) *Attorney, Agent, or Firm* — CANTOR COLBURN LLP

(57) ABSTRACT

A gear device for a gear system for an aircraft includes: an input stage epicyclic gear comprising an input stage sun, an input stage carrier and an input stage ring; and an output stage epicyclic gear comprising an output stage sun, an output stage carrier and an output stage ring. A first input stage component of the input stage sun, the input stage carrier and the input stage ring is fixed to a corresponding first output stage component of the output stage sun, the output stage carrier and the output stage ring, wherein a second input stage component of the input stage sun, the input stage carrier and the input stage ring is fixed to a corresponding second output stage component of the output stage sun, the output stage carrier and the output stage ring. The second input stage component is different from the first input stage component.

13 Claims, 2 Drawing Sheets

(56) References Cited

U.S. PATENT DOCUMENTS

| | | | |
|---|---|---|---|
| 6,739,550 B2* | 5/2004 | Koizumi | B64C 13/341 |
| | | | 244/221 |
| 8,235,861 B2 | 8/2012 | Lopez et al. | |
| 8,845,480 B2* | 9/2014 | Zhang | F16H 1/46 |
| | | | 475/331 |
| 10,259,433 B2 | 4/2019 | Rehfus et al. | |
| 2010/0120574 A1 | 5/2010 | Maekawa | |
| 2011/0009232 A1* | 1/2011 | Kapelevich | F16H 37/041 |
| | | | 475/331 |
| 2015/0126323 A1 | 5/2015 | Li et al. | |

FOREIGN PATENT DOCUMENTS

| | | | | |
|---|---|---|---|---|
| JP | 2015515590 A | | 5/2015 | |
| JP | 2019118220 A | * | 7/2019 | B60K 1/02 |

* cited by examiner

GEAR DEVICE

CROSS REFERENCE TO RELATED APPLICATIONS

This application claims priority to European Patent Application No. 22306724.0 filed Nov. 23, 2022, the entire contents of which is incorporated herein by reference.

This disclosure relates to a gear device and a gear system both of which can be used on an aircraft.

BACKGROUND

Gear devices are used in gear systems in aircraft to convert low torque high speed motion (e.g. from an electric motor) to high torque low speed motion (e.g. to a flight control component). For such gear devices it is desirable to achieve as high a gear ratio as possible for a compact gear device. It is also desirable to reduce design complexity and improve manufacturability of gear devices.

SUMMARY

According to a first aspect, there is provided a gear device for a gear system for an aircraft, the gear device comprising: an input stage epicyclic gear comprising an input stage sun, an input stage carrier and an input stage ring; and an output stage epicyclic gear comprising an output stage sun, an output stage carrier and an output stage ring, wherein a first input stage component of the input stage sun, the input stage carrier and the input stage ring is fixed to a corresponding first output stage component of the output stage sun, the output stage carrier and the output stage ring, wherein a second input stage component of the input stage sun, the input stage carrier and the input stage ring is fixed to a corresponding second output stage component of the output stage sun, the output stage carrier and the output stage ring, wherein the second input stage component is different from the first input stage component, wherein a third input stage component of the input stage sun, the input stage carrier and the input stage ring is held stationary, wherein the third input stage component is different from the first input stage component and the second input stage component, wherein a third output stage component is connectable to an output shaft, the third output stage component corresponding to the third input stage component.

By connecting two epicyclic gears together in this way and fixing an input stage component which corresponds to the output stage component, a high gear ratio may be achieved in a compact gear device with a simple design which is easy to manufacture.

The gear device may comprise the output shaft.

The first input stage component may be the input stage sun and the first output stage component may be the output stage sun.

The second input stage component may be the input stage ring and the second output stage component may be the output stage ring.

The third input stage component may be the input stage carrier and the third output stage component may be the output stage carrier. This may provide a convenient, on-axis output from the gear device.

The first input stage component may be connectable to an input shaft. The gear device may comprise the input shaft.

The input stage epicyclic gear may have an input stage fixed carrier train ratio, Ri, and the output stage epicyclic gear may have an output stage fixed carrier train ratio, Ro, wherein Ri≠Ro and |Ri−Ro|/Ro<1. |Ri−Ro|/Ro may be less than 0.5. |Ri−Ro|/Ro may be approximately 0.2. |Ri−Ro|/Ro may be approximately 0.19. The input stage sun may comprise an input stage sun number of teeth, Nis, and the output stage sun may comprise an output stage sun number of teeth, Nos, wherein Nis≠Nos and |Nis−Nos|/Nos<1. |Nis−Nos|/Nos may be less than 0.5. |Nis−Nos|/Nos may be approximately 0.2. Nis may be approximately 30 and Nos may be approximately 25

Having kinematic similarity but not identity between the input stage epicyclic gear and the output stage epicyclic gear, whilst fixing an input stage component which corresponds to the output stage component, may permit a higher gear ratio to be achieved (e.g. with the fixed input stage component having a speed of zero and the corresponding output stage having a non-zero but close to zero speed).

According to a second aspect, there is provided a gear device for a gear system for an aircraft, the gear device comprising: an input stage epicyclic gear comprising an input stage sun, an input stage carrier and an input stage ring; and an output stage epicyclic gear comprising an output stage sun, an output stage carrier and an output stage ring, wherein the input stage sun is connected to the output stage sun, wherein the input stage ring is connected to the output stage ring, wherein the input stage carrier is held stationary, wherein the output stage carrier is connectable to an output shaft.

The gear device of the second aspect may comprise any of the features described above with respect to the gear device of the first aspect.

According to a third aspect, there is provided a gear system, the gear system comprising the gear device described above (with respect to the first aspect and/or the second aspect) and a system input shaft connectable to an actuator and a system output shaft connectable to flight control component, the input stage epicyclic gear configured to receive torque from the system input shaft and the output stage epicyclic gear configured to transmit torque to the output shaft.

According to a fourth aspect, there is provided a flight control system comprising the gear system described above, the actuator connected to the system input shaft and the flight control component connected to the system output shaft.

The actuator may be an electric motor.

The flight control component may comprise an aileron. The flight control component may comprise a flap. The flight control component may comprise a rudder. The flight control component may comprise a spoiler, The flight control component may comprise an elevator. The flight control component may comprise a slat.

According to a fifth aspect, there is provided an aircraft comprising a flight control system as described above.

The aircraft of the fifth aspect may comprise any of the features of the flight control system of the fourth aspect. The flight control system of the fourth aspect may comprise any of the features of the gear system of the third aspect. The gear system of the third aspect may comprise any of the features of the gear device of the first aspect and/or the second aspect.

BRIEF DESCRIPTION OF FIGURES

Embodiments will be further described and explained by way of example with reference to the accompanying drawings in which.

DETAILED DESCRIPTION

Figure 1:
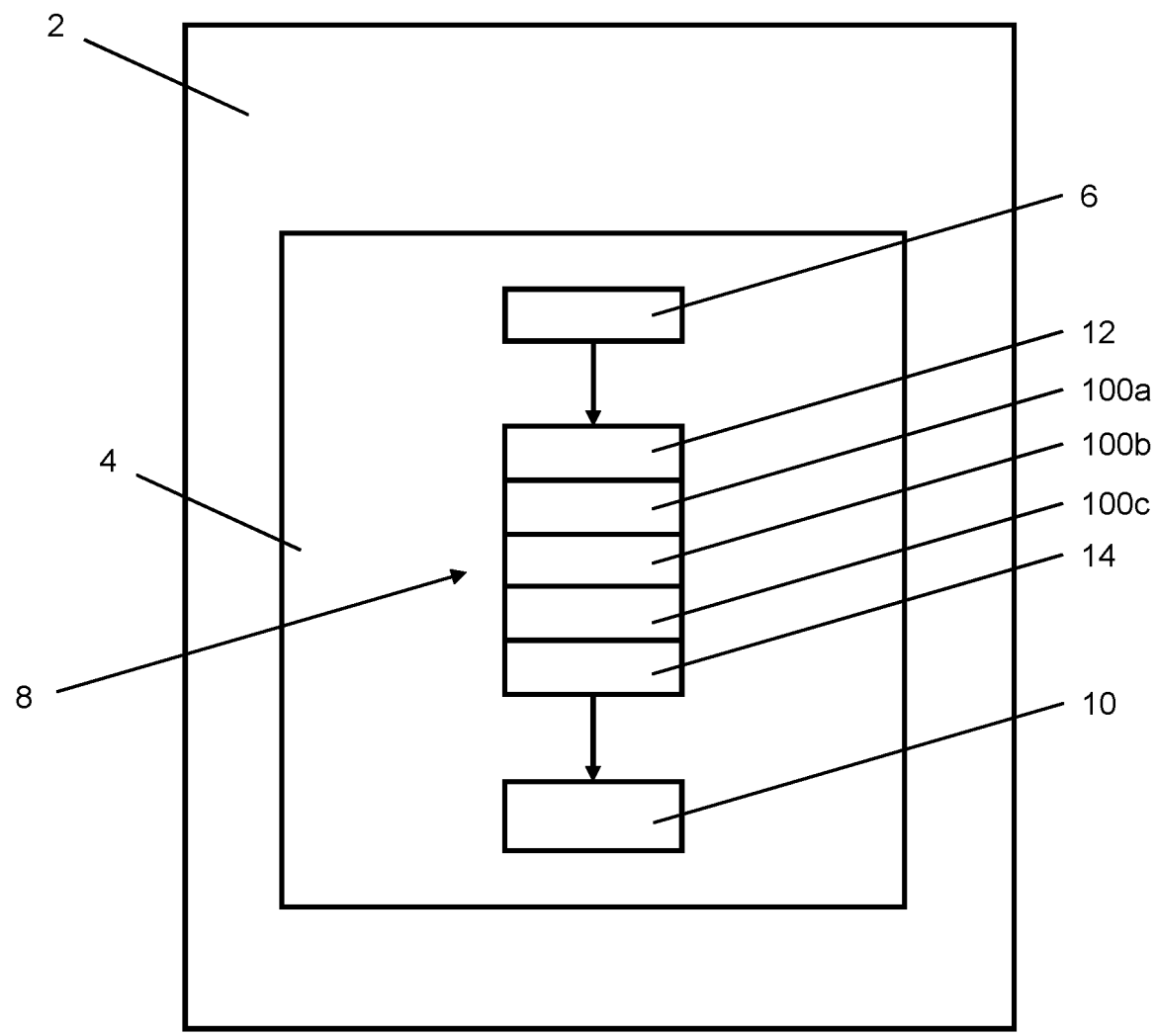
FIG. 1 shows a schematic of an aircraft comprising a flight control system.

With reference to FIG. 1, there is shown an aircraft 2. The aircraft comprises a flight control system 4. The flight control system 4 comprises an actuator 6. The actuator 6 is an electric motor 6. In particular, the actuator 6 is a high speed low torque electric motor 6.

The flight control system 4 comprises a gear system 8. The flight control system 4 comprises a flight control component 10. The flight control component 10 comprises a wing flap. In other examples, the flight control component 10 comprises other components, including an aileron and/or a rudder.

The gear system 8 comprises a system input shaft 12. The system input shaft 12 is connected to the actuator 6. The system input shaft 12 is configured to receive a torque from the actuator 6 and rotate in response to the torque.

The gear system 8 comprises a system output shaft 14. The system output shaft 14 is connected to the flight control component 10. The system output shaft 14 is configure to apply a torque to a shaft (not shown) of the flight control component 10 to control the aircraft 2.

While only a single flight control system is depicted in FIG. 1, it will be understood that in practice the aircraft may include several flight control systems (e.g. ailerons, spoilers, rudders, elevators, slats and/or flaps), with each flight control system comprising one or more flight control components and associated gear systems as described here.

The gear system 8 comprises first, second and third gear devices 100a-c. As described below, each of the first, second and third gear devices 100a-c provides a gearing stage and is configured to increase a torque and reduce a speed of a rotation.

The first, second and third gear devices 100a-c are connected in series. The first gear device 100a is connected to the system input shaft 12 to receive a first rotational motion from the system input shaft 12. The first gear device 100a converts the first rotational motion to a second rotational motion, the second rotational motion being of a higher torque and lower speed than the first rotational motion.

The second gear device 100b is connected to the first gear device 100a to receive the second rotational motion from the first gear device 100a. The second gear device 100b converts the second rotational motion to a third rotation motion, the third rotational motion being of higher torque and lower speed than the second rotational motion.

The third gear device 100c is connected to the second gear device 100b to receive the third rotational motion from the second gear device 100b. The third gear device 100c converts the third rotational motion to a fourth rotational motion, the fourth rotational motion being of higher torque and lower speed than the third rotational motion.

The third gear device 100c is connected to the system output shaft 14. The third gear device 100c provides the fourth rotational motion to the system output shaft 14, such that the system output shaft 14 provides the fourth rotational motion to the flight control component 10.

In other examples, the gear system 8 comprises a different number of gear devices 100a-c to provide a different number of stages (e.g. more than three devices and stages).

Figure 2:
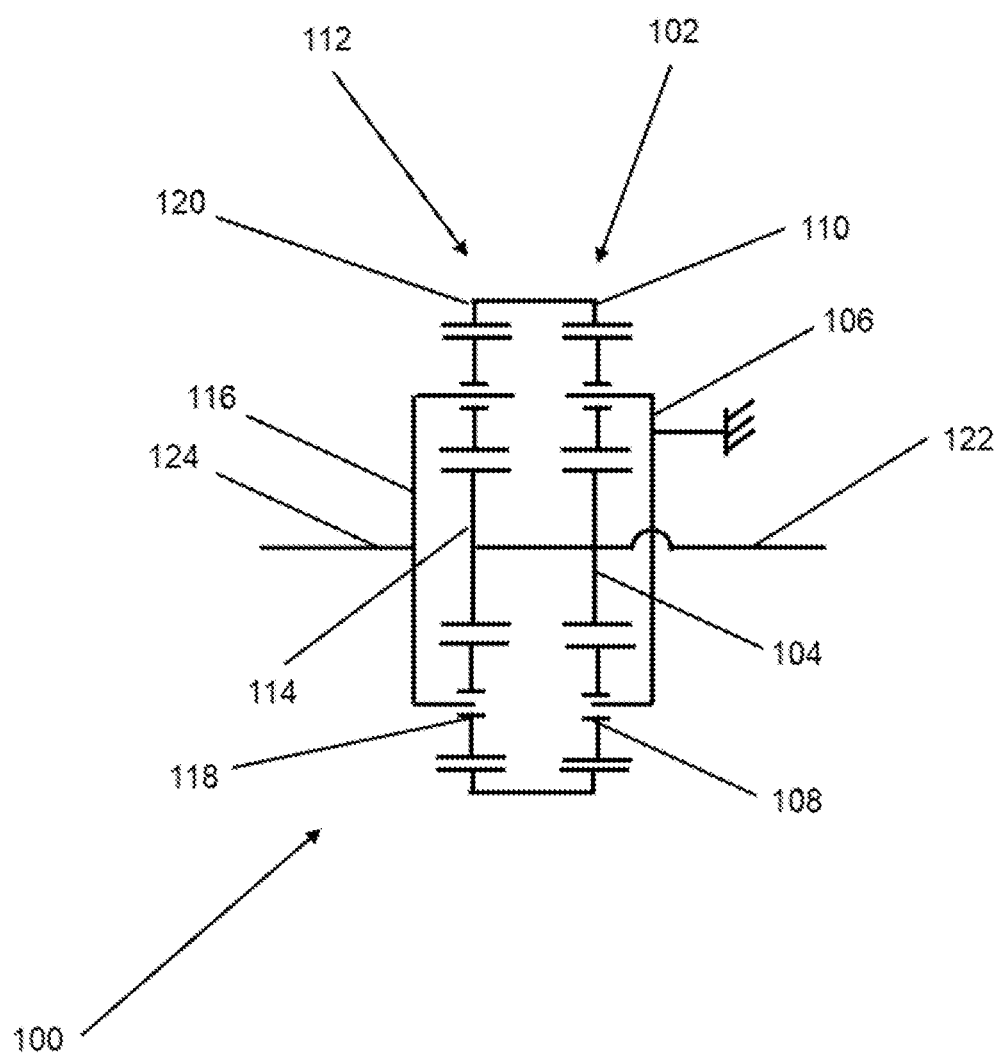
FIG. 2 shows a schematic of a gear device.

Referring to FIG. 2, there is shown a gear device 100, which may be the first gear device 100a, the second gear device 100b and/or the third gear device 100c. The gear device 100 comprises an input stage epicyclic gear 102.

The input stage epicyclic gear 102 comprises an input stage sun 104. The input stage sun 104 is a gear. The input stage sun 104 comprises external teeth (i.e. extending radially outwardly from the input stage sun 104).

The input stage epicyclic gear 102 comprises an input stage carrier 106. The input stage carrier 106 is connected to input stage planets 108. The input stage planets 108 are gears. The input stage planets 108 comprise external teeth (i.e. extending radially outwards from a central axis of each input stage planet 108). The input stage planets 108 mesh with the input stage sun 104. In particular, the teeth of the input stage planets 108 mesh with the teeth of the input stage sun 104.

In the present example the input stage epicycle gear 102 comprises three input stage planets 108. The input stage planets 108 are evenly circumferentially displaced about the input stage sun 104. Each the input stage planet 108 is individually rotatable (e.g. about its central axis) relative to the input stage carrier 106.

The input stage epicyclic gear 102 comprises an input stage ring 110. The input stage ring 110 is a gear. The input stage ring 110 comprises internal teeth (i.e. extending radially inwardly from the input stage ring 110). The input stage ring 110 meshes with the input stage planets 108. In particular, the teeth of the input stage ring 110 mesh with the teeth of the input stage planets 108.

The gear device 100 comprises an output stage epicyclic gear 112.

The output stage epicyclic gear 112 comprises an output stage sun 114. The output stage sun 114 is a gear. The output stage sun 114 comprises external teeth (i.e. extending radially outwardly from the output stage sun 114).

The output stage epicyclic gear 112 comprises an output stage carrier 116. The output stage carrier 116 is connected to output stage planets 118. The output stage planets 118 are gears. The output stage planets 118 comprise external teeth (i.e. extending radially outwards from a central axis of each output stage planet 118). The output stage planets 118 mesh with the output stage sun 114. In particular, the teeth of the output stage planets 118 mesh with the teeth of the output stage sun 114.

In the present example the output stage epicycle gear 112 comprises three output stage planets 118. The output stage planets 118 are evenly circumferentially displaced about the output stage sun 114. Each output stage planet 118 is individually rotatable (e.g. about its central axis) relative to the output stage carrier 116. The output stage planets 118 are able to orbit the output stage sun 112, causing rotation of the output stage carrier 116.

The output stage epicyclic gear 112 comprises an output stage ring 120. The output stage ring 120 is a gear. The output stage ring 120 comprises internal teeth (i.e. extending radially inwardly from the output stage ring 120). The output stage ring 120 meshes with the output stage planets 118. In particular, the teeth of the output stage ring 120 mesh with the teeth of the output stage planets 118.

The gear device 100 comprises an input shaft 122 and an output shaft 124. Depending on the position of the gear device 100 within the gear system 8 (i.e. which stage it is), the input shaft 122 is connected to an output shaft of another gear device or to the actuator 6 to receive rotational motion therefrom. Depending on the position of the gear device 100 with the gear system 8 (i.e. which stage it is), the output shaft 124 is connected to an input shaft of another gear device or to the flight control component 10 to transmit rotation motion therefrom.

Each component of the input stage epicyclic gear 102 corresponds to a component of the output stage epicyclic gear 112. The input stage sun 104 corresponds to the output stage sun 114. The input stage carrier 106 corresponds the output stage carrier 116. The input stage ring 110 corresponds to the output stage ring 120.

The input stage epicyclic gear 102 and the output stage epicyclic gear 112 are arranged concentrically with each other. In particular, the input stage sun 104 is concentric with the output stage sun 114. The input stage carrier 106 is concentric with the output stage carrier 116. The input stage ring 110 is concentric with the output stage ring 120.

A first input stage component of the input stage sun 104, the input stage carrier 106 and the input stage ring 110 is fixed to a corresponding first output stage component of the output stage sun 114, the output stage carrier 116 and the output stage ring 120. The first input stage component is connected to the input shaft 122. In the present example, the first input stage component is the input stage sun 104. The first output stage component is the output stage sun 114.

As such, the input stage sun 104 is rigidly connected to the input shaft 122 (in the present example, formed as an integral component), such that the input stage sun 104 is configured to rotate with the input shaft 122. The output stage sun 114 is rigidly connected to the input stage sun 104. The output stage sun 114 is rigidly connected to the input shaft 122 (via the input stage sun 104). The output stage sun 114 is therefore configured to rotate with the input stage sun 104 and the input shaft 122.

A second input stage component of the input stage sun 104, the input stage carrier 106 and the input stage ring 110 is fixed to a corresponding second output stage component of the output stage sun 114, the output stage carrier 116 and the output stage ring 120. The second input stage component is a different component from the first input stage component. In the present example, the second input stage component is the input stage ring 110. The second output stage component is the output stage ring 120.

As such, the input stage ring 110 is rigidly connected to the output stage ring 120 (in the present example, formed as an integral component), such that the output stage ring 120 is configured to rotate with the input stage ring 110.

A third input stage component of the input stage sun 104, the input stage carrier 106 and the input stage ring 110 is held stationary. The third input stage component is a different component from the first input stage component and the second input stage component. A third output stage component of output stage sun 114, the output stage carrier 116 and the output stage ring 120 is connected to the output shaft 124. The third output stage component corresponds to the third input stage component. In the present example, the third input stage component is the input stage carrier 106 and the third output stage component is the output stage carrier 116.

As such, rotation of the input stage carrier 106 is prevented, also preventing the orbiting of the input stage planets 118 about the input stage sun 104. The output stage carrier 116 is rigidly connected to the output shaft 124, such that the output shaft 124 is configured to rotate with the output stage carrier 116 (i.e. on orbiting of the output stage planets 118 about the output stage sun 114).

The input stage sun 104 comprises an input stage sun number of teeth, Nis. In the present example, Nis=30. The input stage ring 110 comprises an input stage ring number of teeth, Nir. In the present example, Nir=66. It will be understood that the number of teeth of each input stage planet 108 is defined by Nis and Nir, so discussion of the number of teeth of each input stage planet 108 is omitted.

The input stage epicyclic gear 102 is defined by a fixed carrier train ratio, Ri, where Ri=−Nir/Nis. In the present example, Ri=−2.2 (2 significant figures).

The output stage sun 114 comprises an output stage sun number of teeth, Nos. In the present example, Nos=25. The output stage ring 120 comprises an output stage ring number of teeth, Nor. In the present example, Nor=68. It will be understood that the number of teeth of each output stage planet 108 is defined by Nos and Nor.

The output stage epicyclic gear 112 is defined by a fixed carrier train ratio, Ro, wherein Ro=−Nor/Nos. In the present example, Ro=2.7 (2 significant figures).

In use, the input shaft 122 rotates, causing rotation of the input stage sun 104. The rotation of the input stage sun 104 causes rotation of the input stage planets 108 about their own axes. Rotation of the input stage carrier 106 is prevented, so the input stage planets 108 cannot orbit the input stage sun 104.

The rotation of the input stage planets 108 causes rotation of the input stage ring 110.

The output stage sun 114 rotates at the same speed as the input stage sun 104. The output stage ring 120 rotates at the same speed as the input stage ring 110.

The fixed carrier train ratios of the input and output epicyclic gears 102, 112 are different (due to different kinematics of the input and output epicyclic gears resulting from different numbers of teeth), which means that the rotation of the output stage ring 120 and the output stage sun 114 causes rotation of the output stage carrier 116. This in turn causes rotation of the output shaft 124.

Because the input stage carrier is fixed 106, the output stage carrier 116 is only able to rotate slowly. This results in output rotation at the output shaft 124 which is significantly lower speed and higher torque than at the input shaft 122, resulting in a high gear ratio for a compact gear device 100.

In the present example this effect is amplified by the input stage epicyclic gear and the output stage epicyclic gear being kinematically similar but not identical, which, due to the input stage carrier having zero rotation, results in the speed of the rotation of the output stage carrier 116 being close to zero but not zero.

The applicant has found that gear ratio is further increased where the input stage fixed carrier train ratio, Ri, is close but not the same as the output stage fixed carrier train ratio, Ro, in particular where |Ri−Ro|/Ro<1. In the present example, |Ri−Ro|/Ro=0.19 (2 sf).

Additionally, the applicant has found that the gear ratio is further increased where the input stage sun number of teeth, Nis, is similar but not identical to the output stage sun number of teeth, Nos, in particular, where |Nis−Nos|/Nos<1. In the present example, |Nis−Nos|/Nos=0.20 (2 sf).

In the present example, the gear ratio is 15.

In general, by increasing the kinematic similarity between the input stage epicyclic gear and the output stage epicyclic gear, the gear ratio increases. However, increasing the kinematic similarity may also require tighter manufacturing tolerances. Increasing the kinematic similarity, particularly where tight manufacturing tolerances cannot be achieved, may increase contact friction between the gears, reducing efficiency of the system. Design of the gear device may also be constrained by gears needing to have an integer number of teeth.

Various aspects of the gear device disclosed in the various embodiments may be used alone, in combination, or in a variety of arrangements not specifically discussed in the embodiments described in the foregoing and this disclosure is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from the invention in its broader aspects. The scope of the following claims should not be limited by the embodiments set forth in the examples, but should be given the broadest reasonable interpretation consistent with the description as a whole.

The invention claimed is:

1. A gear arrangement for an aircraft, comprising
a plurality of gear systems, each of the gear system comprising:
an input shaft;
an output shaft;
an input stage epicyclic gear comprising an input stage sun that is configured to rotate and connected to the input shaft, an input stage carrier that is stationary, an input stage ring that is configured to rotate, and input stage planetary gears supported by the input stage carrier and disposed between the input stage sun and input stage ring; and
an output stage epicyclic gear comprising an output stage sun that is rotationally fixed to the input stage sun, an output stage carrier that is configured to rotate and connected directly or indirectly to the output shaft, an output stage ring that is rotationally fixed to the input stage ring, and output stage planetary gears supported by the output stage carrier and disposed between the output stage sun and output stage ring;
wherein the input stage epicyclic gear and the output stage epicyclic gear are arranged concentrically with each other such that the input and output stage suns are concentric with each other, the input and output stage carriers are concentric with each other, and the input and output stage rings are concentric with each other; and
a first fixed carrier train ratio of the input stage epicyclic gear and a second fixed carrier train ratio of the output stage epicyclic gear are configured such that when the input shaft rotates at a first speed, the input and output stage suns rotate together at the first speed, the input and output stage rings rotate together at a second speed, and the output stage carrier rotates at a third speed that is less than the first speed,
whereby the output shaft rotates slower than the input shaft, and when the output shaft is connected directly to the output stage carrier, the output shaft rotates at the third speed,
wherein the plurality of gear systems are connected to one another in series, wherein the input shaft is connected to the input stage sun of a first one of the gear systems and the output shaft is connected to the output stage carrier of a last one of the gear systems, wherein each of the gear systems is configured to reduce rotational speed and increase torque relative to a previous one of the gear systems so that, in operation, the output shaft rotates at a reduced speed relative to the input shaft and delivers greater torque than the input shaft.

2. The gear arrangement of claim 1, wherein the first fixed carrier train ratio is Ri, the second fixed carrier train ratio is Ro, and wherein $Ri \neq Ro$ and $|Ri-Ro|/Ro<1$.

3. The gear arrangement of claim 2, wherein $|Ri-Ro|/Ro<0.5$.

4. The of claim 2, wherein $|Ri-Ro|/Ro \approx 0.19$.

5. The gear arrangement of claim 1, wherein the input stage sun comprises an input stage sun number of teeth, Nis, and the output stage sun comprises an output stage sun number of teeth, Nos, wherein $Nis \neq Nos$ and $|Nis-Nos|/Nos<1$.

6. The gear arrangement of claim 5, wherein $|Nis-Nos|/Nos<0.5$.

7. The gear arrangement of claim 5, wherein $Nis \approx 30$ and $Nos \approx 25$.

8. The of claim 5, wherein $|Nis-Nos|/Nos \approx 0.2$.

9. A flight control system comprising:
the gear arrangement of claim 1;
an actuator coupled to the input shaft; and
a flight control component connected to the output shaft.

10. The flight control of claim 9, wherein the actuator is an electric motor.

11. The flight control of claim 9, wherein the flight control component comprises one or more of an aileron, a flap, a spoiler, an elevator, a slat, or a rudder.

12. An aircraft comprising:
the flight control of claim 11.

13. An aircraft comprising:
one or more of an aileron, a flap, a spoiler, an elevator, a slat or a rudder;
the flight control of claim 1,
wherein the flight control component comprises the one or more of the aileron, the flap, the spoiler, the elevator, the slat or the rudder.

* * * * *